Sept. 11, 1962 R. L. HOLLOWAY 3,053,600
SELF-LEVELING STORING AND DISPENSING APPARATUS
Filed May 8, 1959
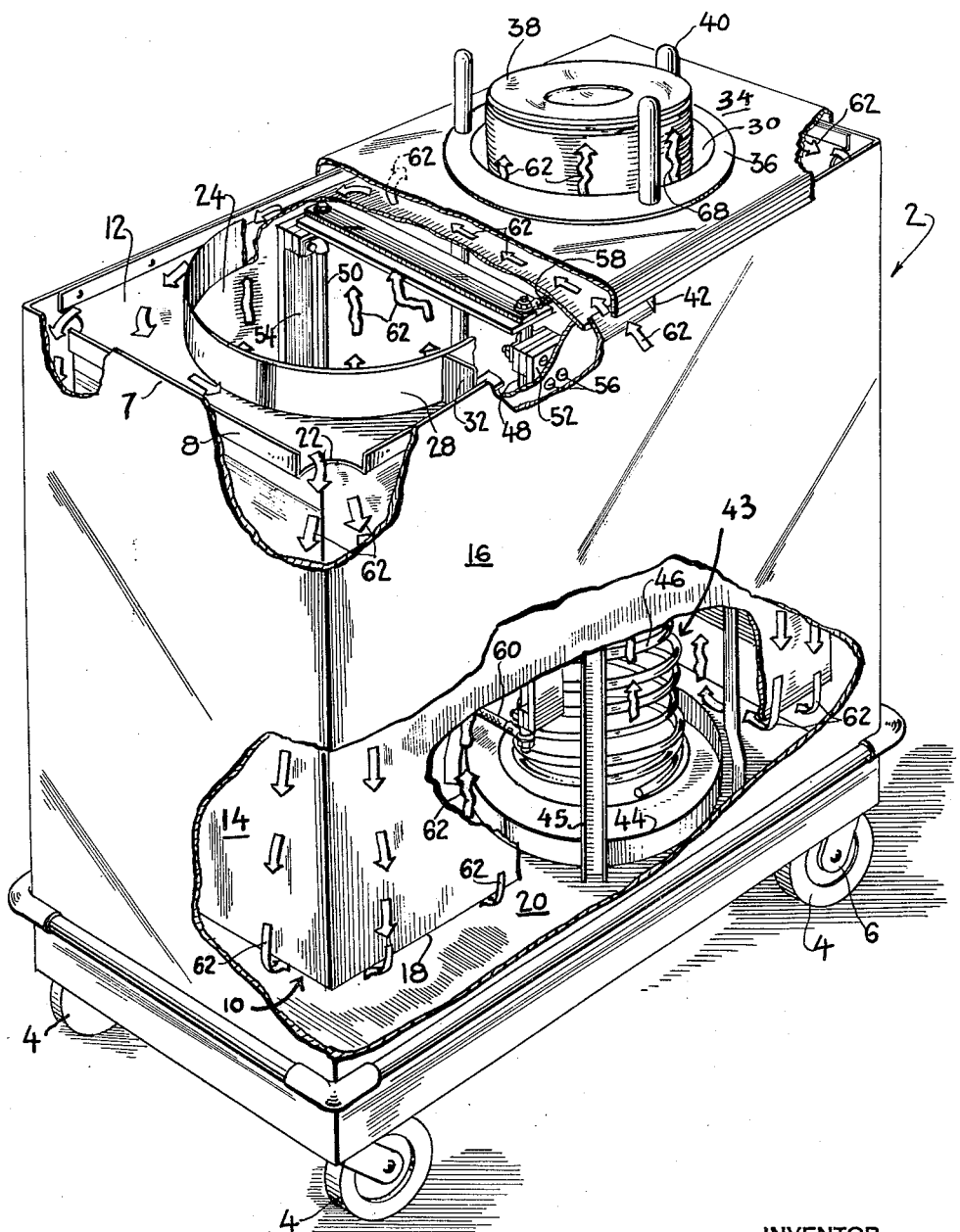
INVENTOR
Robert L. Holloway
BY
Tenner Ekstad
ATTORNEY

United States Patent Office 3,053,600
Patented Sept. 11, 1962

3,053,600
SELF-LEVELING STORING AND DISPENSING APPARATUS
Robert L. Holloway, Snyder, N.Y., assignor to American Machine & Foundry Company, a corporation of New Jersey
Filed May 8, 1959, Ser. No. 811,993
5 Claims. (Cl. 312—71)

This invention relates to apparatus for storing and feeding stacked articles, such as trays and dishes including plates, saucers and cups and the like, and particularly to such apparatus which employs heating means for maintaining the trays and dishes warm until the time when they are actually used for serving food.

In heated self leveling dispensers of this type, heretofore employed, the outer surfaces or skin of the unit became very hot, which caused considerable discomfort if a person removing a dish should accidentally come in contact with the surface. Insulators and asbestos sheeting used to cut down this surplus heat, were not successful because the heat would either pass through the asbestos or would by pass the asbestos through the metal parts making up the self leveling housing. As a consequence, not only was there an undesirable heat loss, but there was physical discomfort to the user of the self leveling dispenser.

It is therefore an object of the present invention to provide an apparatus of the above described type, wherein the outer casing or cabinet is maintained at a temperature which is comfortable for personal contact or touch during operation.

Another object of the invention is to provide such an apparatus, in which the cost of power consumption for heating purposes is substantially reduced, as contrasted with similar services now in use.

A further object of the invention is to provide such apparatus which is of simple construction and economical to manufacture.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

The drawing shows a perspective view of a self leveling storing and dispensing apparatus with parts broken away to illustrate my invention.

In the drawing, an outer casing 2 of the apparatus is provided with casters 4 secured to the casing by means of brackets 6, to thus permit the apparatus to be moved about to a desired location in a restaurant or cafeteria.

An inner casing or housing 10 is secured to the upper edge 7 of casing 2, by means of flange 8. The inner casing comprises a top panel 12, and side walls 14 having reflective surfaces and spaced from the side walls 16 or outer casing 2. Inner casing 10 is formed with an open bottom portion defined by edges 18 which are spaced from the bottom panel or platform 20 of the outer casing 2.

Top panel 12, of the inner casing 10, is formed with cutout openings 22 to permit the passage of air from above the panel into the space between the side walls of the inner and outer casings. Top panel 12 is further provided with a pair of spaced openings, one of which is shown at 24, the openings being defined by upwardly extending circular flanges or collars 28 and 30 which protrude above upper edge 7 of outer casing 2, as may be readily seen by inspecting baffles 32, interposed between circular flange or collar 28 and upper edge 7 of outer casing 2.

The flanges or collars act as supports for a removable cover or lid shown in part at 34, which fits over the edges 7 of the outer casing 2. Cover or lid 34 is provided with a pair of circular openings spaced from one another, each opening being aligned with one of the circular flanges or collars to permit the stacking of dishes.

As is apparent from the drawing an air chamber is formed between the spaced top panel 12 of the inner casing and the cover or lid 34, the ingress of air from without, to the chamber, being provided by a duct 42 in wall 16 of outer casing 2, and the egress of air through openings 22.

Suspended by means of circular flanges 36 formed with downwardly depending extensions 30, through the openings in tops 34 and 12, is a pair of dispensing mechanisms, one of which is shown at 43, and includes a support 44 for spring 46 of the dispensing mechanism. Support 44 is secured to the lower portions of channels 45, the upper portions of the channels being secured to flange 36, so that the entire dispensing mechanism may be removed. Upwardly extending guides 40, secured to the flange 36, prevent the displacement of the stacked dishes which extend above the surface of cover or lid 34. Such dispensing mechanisms are well known in the art, as described for example, in U.S. Patent 2,251,876 granted to William J. Gibbs on August 5, 1941, or could employ the operating mechanism shown in U.S. Patent 2,609,265 without a completely enclosed casing.

The dispensing mechanisms of the present device, however, permit free circulation of air therethrough, a source of heat being provided intermediate both of the mechanisms. The heat source comprises a pair of heating elements 48, 50, appropriately mounted on brackets 52, which are secured to walls 14 of inner casing 10, as at 56. To distribute the heat to all sides of the dishes there are provided reflectors 54, which are likewise secured to mounting brackets 52. The walls of the inner casing 10 have reflective surfaces to assist in the distribution of radiant heat to all sides of the dishes. Wires 58, 60 serve to connect the heating elements to a source of electric power, by way of a receptacle, not shown, mounted on the exterior wall of the apparatus.

The operation of the apparatus is as follows:

After a stack of dishes 38 has been placed in the wall of the dispensing mechanism, heating elements 48, 50 are connected to a source of electric power.

Heating elements 50 transmit radiant heat to the stacks of dishes 38, which act as receiver collectors of the radiant heat. Some of the air in the vicinity of the heaters and dishes is heated and rises by thermal convection. Cold air enters through duct 42 into the air space or chamber formed by spaced panel 12 and lid 34. Due to the provision of baffle plates 32, the cold air follows the path about collars 28 and 30, indicated by arrows 62, to displace the heated air which has risen, moving downwardly through openings 22 into the space between walls 14 of inner casing 10 and outer casing 16. The cold air circulating between panel 12 and lid 34, as well as between walls 14 and 16 of the inner and outer casings insulates the former from the latter. The circulation of air within the apparatus is clearly shown by the arrows 62 wherein the cooler air from the atmosphere enters through the aperture 42 and circulates beneath the top 34 of the outer housing through the space between the walls of the inner casing 10 and the outer casing 16 into the interior of the inner casing 10 wherein the air is then heated by the heating elements 48 and 50 and rises outwardly of the openings 30. Direct dissipation of heat from the inner casing is thereby substantially reduced, while at the same time making the outer casing comfortable to personal contact. It will be seen that otherwise waste heat is used to induce the convection air flow which cools the case. Further the cooling air is preheated by the case, thus reducing the total heat necessary to be supplied in keeping the dishes at the desired temperature.

While in the drawing there has been shown an apparatus provided with spaced walls and tops, it will be appreciated only the space between the tops could be air cooled, if desired, and other means, such as asbestos, could be employed to insulate the outer walls of the housing. In such an embodiment the air passage between the tops of the apparatus would be connected to the aperture opening through which the articles are dispensed to provide an air passage for the circulatory air.

Furthermore, while a compression spring is employed in the embodiment illustrated in the drawing, tension springs and chains could be employed instead, since the principle of the invention is applicable to any type of self leveling dispensing mechanism, regardless of the manner in which the stacked load of articles to be dispensed is counterbalanced. If desired, reference may be made to U.S. Patent 2,717,085 granted to W. H. Waddington on September 26, 1955, and U.S. Patent 2,251,874 granted to W. J. Gibbs on August 5, 1941, for this type of counterbalancing structure.

The invention hereinabove described may therefore be varied in construction within the scope of the claims, for the particular device selected to illustrate the invention is but one of many possible embodiments of the same. The invention, therefore, is not to be restricted to the precise details of the structure shown and described.

What is claimed is:

1. Storing and dispensing apparatus for stacked articles, comprising a closed outer housing provided with an air inlet near the top thereof, an inner housing secured to said outer housing and having an open bottom portion spaced from said outer housing, both said housings having complementary spaced walls and tops forming an interconnecting air passageway therebetween, said tops formed with aligned openings sealed from said air space, a vertically movable carrier adapted to hold stacked articles extending through said openings, and means for heating the stacked articles in said inner housing, and for creating an air flow about the heating means and the articles to cause air to move into said air inlet within the spaced tops, through said complementary spaced walls and up through the inner housing whereby to cool said housings.

2. Storing and dispensing apparatus for stacked articles, comprising a closed outer housing provided with an air inlet, an inner housing having an open bottom spaced from said outer housing, both said housings having complementary spaced walls and tops forming an interconnecting air space therebetween, said tops having pairs of aligned openings sealed from said air space, a pair of spaced dispensing mechanisms adapted to hold stacked articles extending through said openings, and heating means in said inner housing, interposed between said pair of mechanisms, for heating the stacked articles and for creating a thermal convection within said housings to induce an air flow through the air inlet, through the air space and up through said inner housing.

3. Storing and dispensing apparatus for stacked articles, comprising a closed outer housing provided with an air inlet near the top thereof, an inner housing secured to said outer housing and spaced therefrom, both said housings having complementary spaced walls and tops forming an interconnecting air passageway therebetween, said inner housing having at least one opening in the bottom thereof permitting communication between the interior of said inner housing and said spaced passageway, said tops formed with aligned openings sealed from said air space, vertically movable mechanisms adapted to hold stacked articles extending through said openings, and means for heating the stacked articles in said inner housing, and for creating a circulation of cool air from without said apparatus through said inlet, said passageway and said inner housing.

4. Storing and dispensing apparatus for stacked articles, comprising a closed vertically extending outer housing formed with a supporting platform and provided with an air inlet at the upper end thereof, an inner vertically extending housing having an open bottom spaced from said supporting platform, both of said housings having complementary vertically extending spaced walls and horizontally extending tops forming an interconnected air space therebetween, said tops being provided with an opening to said inner housing sealed from said air space, said air space having an aperture for admitting air from the outside atmosphere and duct means for directing the incoming air beneath the top of said outer housing before it enters between the spaced walls of said housings, carrier means for holding stacked articles located within said inner housing, heating means positioned to heat the stacked articles in said inner housing and for creating a thermal convection to cause said air within said inner housing to rise and to induce air into said aperture, said spaced top, said complementary spaced walls and thence into said inner housing.

5. The apparatus according to claim 4 wherein the duct means include a horizontally lying plate positioned between the tops of the inner and outer housing.

References Cited in the file of this patent

UNITED STATES PATENTS

| | | |
|---|---|---|
| 965,391 | Little | July 26, 1910 |
| 2,251,874 | Gibbs | Aug. 5, 1941 |
| 2,339,365 | Van Guilder | Jan. 18, 1944 |
| 2,630,110 | Wallis | Mar. 3, 1953 |